March 18, 1958 J. W. MARION ET AL 2,826,856
SNELLED FISH HOOK RETAINER
Filed Feb. 26, 1957
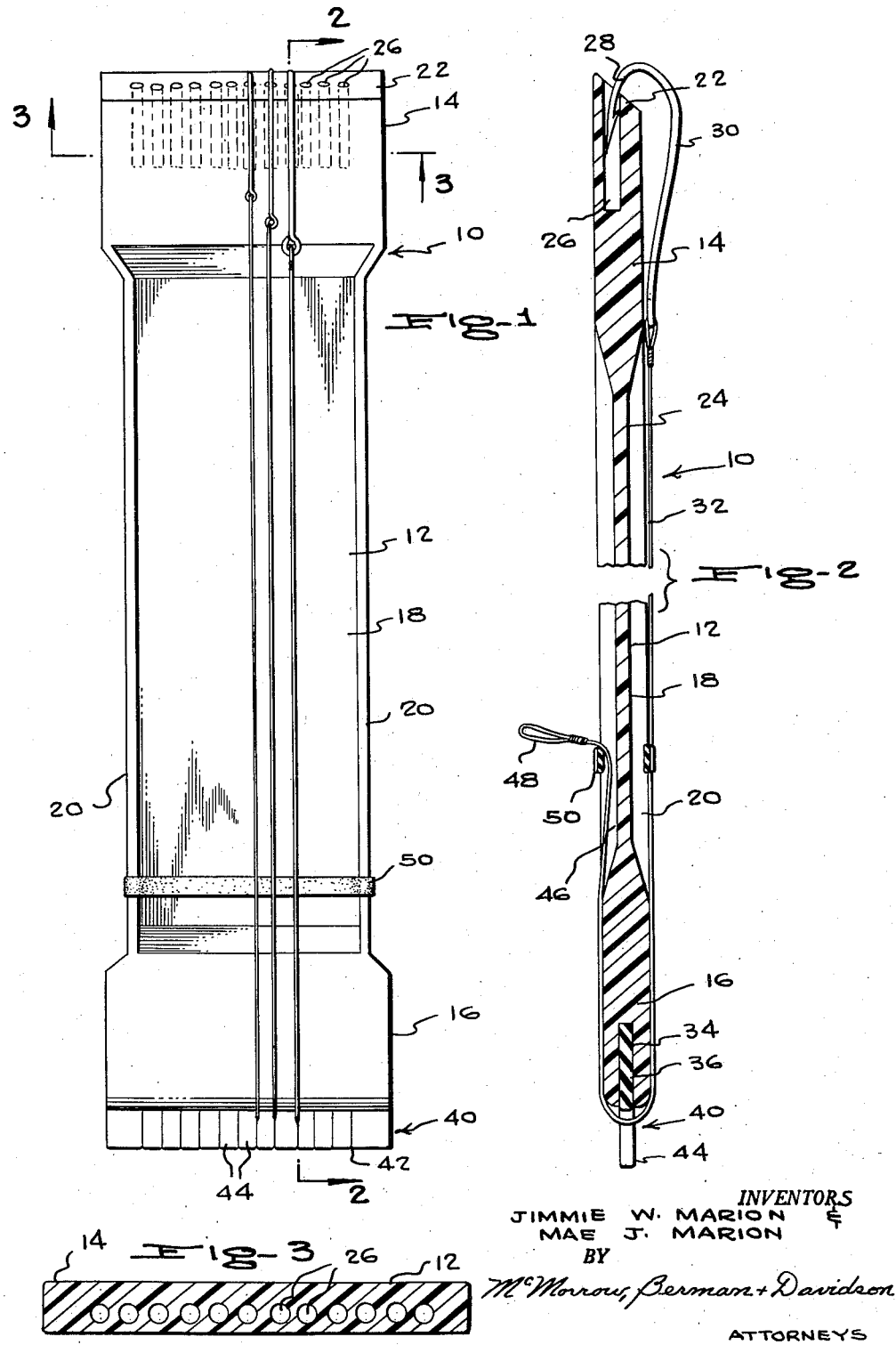
INVENTORS
JIMMIE W. MARION &
MAE J. MARION
BY
McMorrow, Berman + Davidson
ATTORNEYS

2,826,856

SNELLED FISH HOOK RETAINER

Jimmie W. Marion and Mae J. Marion, Miami, Fla.

Application February 26, 1957, Serial No. 642,480

8 Claims. (Cl. 43—57.5)

The present invention appertains to improvements in retainers or protective holders for fish hooks and particularly relates to a novel or improved holder for snelled fish hooks which have snells or leaders attached to their eye ends.

A primary object of the present invention is to provide a holder for snelled fish hooks, which holder protectively houses the hooks against contact with objects or the person and retains the snells in a taut condition, protected against entanglement, and which can be stored flat or on edge in a standard tackle box.

Another important object of this invention is to provide an elongated, substantially flat holder which has axial bores at one end to house the pointed ends of the hooks and has means at the other end through which the snells are passed to be resiliently clamped and held in a taut condition, with means being provided intermediate the ends for holding the looped ends of the snells that are wrapped around the end of the holder.

Another important object of the present invention is to provide a holder which is substantially flat and elongated and which has opposing ends, one of which has bores for housing the pointed ends of the hooks and the other end, around which the snells are wrapped, having resilient fingers between which the snells are passed to be gripped and held thereby, with a resilient band being disposed transversely of the holder at one side to hold the looped ends of the snells.

Another important object of the present invention is to provide a one-piece holder fabricated from plastic and having end portions of similar thickness and a main portion of a smaller thickness and having side edges of a thickness equal to the thickness of the end portions, so that the snells overlying the main portion are protected by the side edges and end portions.

A further important object of the present invention is to provide an inexpensive, compact and sturdy one-piece holder which will accommodate a plurality of snells and hooks and will hold them in separate, untangled relation for easy and quick removal.

The foregoing and ancillary objects are attained by this invention, the preferred embodiment of which is set forth in the following description and illustrated in the accompanying drawing, wherein:

Figure 1 is a front elevational view of the snelled fish hook holder of this invention;

Figure 2 is a longitudinal sectional view taken on line 2—2 of Figure 1, and,

Figure 3 is a cross-sectional view taken on line 3—3 of Figure 1.

Referring now more particularly to the accompanying drawing, the holder 10 is formed in one-piece from suitable material and is preferably molded from a suitable plastic material. The holder includes an elongated and substantially flat body portion 12 which includes end portions 14 and 16 and a main or connecting portion 18. The end portions are slightly wider than the portion 18 and are coextensive in width, length and thickness. The thickness of the end portions is considered of importance in the retention of the snells in relation to the thickness of the portion 18. As shown in Figure 2, the end portions are identical in thickness and are thicker than the portion 18 which has side edges 20 that are of a thickness equal to the thickness of the end portions.

The end portion 14 is formed with a beveled free end edge 22 that slopes toward the side 24 of the body portion 12. The end portion 14 is formed with axial bores 26 that are co-extensive in length and extend through the end edge 22. The bores are of a diameter sufficient to receive and house the pointed ends 28 of fish hooks 30, which can be large or small.

The snells or leaders 32 of the hooks extend longitudinally between the end portions and overlie the portion 18 between the thickened side edges.

The end portion 16 is formed with an axial slot 34 within which a rubber strip 36 is fixedly socketed as by being molded with the body portion. The strip 38 has a projecting section 40 which is formed with axial slits 42 that are spaced transversely to form resilient fingers 44. The snells are passed between the fingers into the slits and are held substantially taut.

The snells are wrapped around the end portion 16, between the resilient fingers and extend along the side 46 of the body portion. The looped ends 48 of the snells are held under an elastic band 50 which encircles the body portion and can be moved axially thereof. The band extends transversely across the side 46 and holds the looped ends against movement.

In use, the ends 28 of the hooks 30 are fitted in the bores 26, the beveled end edge 22 permitting the shanks of the hooks to extend parallel with the body portion. The snells are wrapped around the end portion 16 and are pulled tight as they are inserted into the slits, which parallel the bores. The looped ends of the snells are then fitted under the band 50, which can be moved axially of the body portion in accordance with the lengths of the snells. The thickened end portions and side edges protect the snells which can move inwardly over the portion 18.

While the best known form of the invention has been disclosed herein, other forms may be realized or come within the scope and spirit of the appended claims.

What is claimed is:

1. A holder for snelled fish hooks comprising an elongated, substantially flat body portion having opposing ends, one of said ends being provided with axially extending bores adapted to house the pointed ends of the fish hooks with the snells wrapped around the other end, means on said other end in alignment with the bores for clampingly receiving and holding the snells against axial movement and means provided on the body portion intermediate the ends for retaining the looped ends of the snells in proximity to the body portion.

2. A holder for snelled fish hooks comprising an elongated, substantially flat body portion having opposing sides and opposing ends, one of said ends being provided with axially extending bores to protectively house the pointed ends of snelled fish hooks with the snells extending axially on one side of the body portion and wrapped around the other end of the body portion and extending axially on the other side to a point intermediate the ends, said other end of the body portion being resilient and having narrow axial slits extending through the end edge and disposed in alignment with the bores to clampingly receive the snells and hold them against axial movement and means disposed on the other side of the body portion for retaining the looped ends of the snells in proximity to the body portion.

3. A holder for snelled fish hooks comprising an elongated, substantially flat body portion having opposing sides and opposing ends, one of said ends being provided with axially extending bores to protectively house the pointed ends of snelled fish hooks with the snells extending axially on one side of the body portion and wrapped around the other end of the body portion and extending axially on the other side to a point intermediate the ends, said other end of the body portion being resilient and having narrow axial slits extending through the end edge and disposed in alignment with the bores to clampingly receive the snells and hold them against axial movement and means disposed on the other side of the body portion for retaining the looped ends of the snells in proximity to the body portion, said last means including a resilient band disposed transversely of the body portion and under which the portions of the snells at the looped ends are adapted to fit.

4. A holder for snelled fish hooks comprising an elongated, substantially flat body portion having opposing sides and opposing ends, one of said ends being provided with axially extending bores to protectively house the pointed ends of snelled fish hooks with the snells extending axially on one side of the body portion and wrapped around the other end of the body portion and extending axially on the other side to a point intermediate the ends, said other end of the body portion being resilient and having narrow axial slits extending through the end edge and disposed in alignment with the bores to clampingly receive the snells and hold them against axial movement and means disposed on the other side of the body portion for retaining the looped ends of the snells in proximity to the body portion, said body portion having its end portions of the same thickness and having the portion connecting said end portions and over which the snells extend of a reduced thickness, said connecting portion having thickened side edges of the same thickness on the end portions.

5. A holder for snelled fish hooks comprising a one-piece plastic, elongated, substantially flat body portion having opposing sides and opposing end portions, one of said end portions having a beveled end edge and being formed with axial bores extending through said end edge to protectively receive the pointed ends of snelled fish hooks with the snells extending axially over one side and wrapped around the other end portion and extending axially over the other side of the body portion to a point intermediate the end portions, said other end portion of the body portion terminating in a resilient end edge having axial slits in alignment with the bores to clampingly engage and hold the snells, and means provided on the other side of the body portion for retaining the looped ends of the snells against outward movement from the body portion.

6. A holder for snelled fish hooks as claimed in claim 5, wherein said last means includes a resilient band transversely extended across the other side of the body portion.

7. A holder for snelled fish hooks as claimed in claim 5, wherein said end portions of the body portion are of similar thickness and said portion intermediate said end portion is of a reduced thickness and has side edges of the same thickness as the end portions.

8. A holder for snelled fish hooks as claimed in claim 5, wherein said other end portion has an axial slot extending substantially the full width thereof and extending through the end edge thereof and said resilient end edge is a rubber strip socketed in the slot and having clamping fingers defined by the slits with the snells being adapted to fit in the slits and to be held by the sides of the fingers.

References Cited in the file of this patent

UNITED STATES PATENTS

| | | |
|---|---|---|
| 2,574,908 | Buicke | Nov. 13, 1951 |
| 2,624,973 | Wilcock et al. | Jan. 13, 1953 |